3,828,076
3-(3-SUBSTITUTED AMINO-2-HYDROXYPRO-
POXY)-2-SUBSTITUTED-4-PYRANONES
Burton Kendall Wasson, Valois, Quebec, and Clarence
Stanley Rooney, Beaconsfield, Quebec, Canada, assignors to Merck Sharp & Dohme (I.A.) Corporation, Rahway, N.J.
No Drawing. Filed Mar. 15, 1973, Ser. No. 341,422
Int. Cl. C07d 7/16
U.S. Cl. 260—345.9          3 Claims

ABSTRACT OF THE DISCLOSURE

3 - (3 - Substituted amino-2-hydroxypropoxy)-2-substituted-4-pyranone products possessing $\beta$-adrenergic blocking properties are described. Products are made by reaction of 3-hydroxy-2-substituted-4-pyranone with an epihalohydrin and the epoxide formed reacted with the appropriate substituted amine.

---

This invention is concerned with 3-(3-substituted amino-2-hydroxypropoxy)-2-substituted-4-pyranones which exhibit $\beta$-adrenergic blocking properties.

The novel pyranone $\beta$-adrenergic blocking agents of this invention have the structure

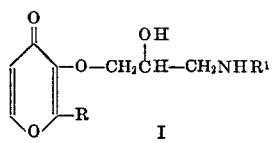

and pharmacologically acceptable salts thereof wherein R represents $C_{1-3}$ alkyl and phenyl-$C_{1-3}$ alkyl; and $R^1$ represents a straight or branched chain $C_{3-6}$ alkyl, a straight or branched chain hydroxy substituted $C_{3-6}$ alkyl, a straight or branched chain $C_{3-}$ alkylnyl, phenyl-$C_{1-6}$ alkyl or indolyl-$C_{1-6}$ alkyl.

The pharmacologically acceptable salts of the novel pyranones are advantageously acid addition salts derived from inorganic acids for example hydrochlorides, hydrobromides, phosphates or sulfates or salts derived from organic acids for example oxalates, lactates, malates, maleates, formates, acetates, succinates, tartrates, salicylates, citrates, phenylacetates, benzoates, p-toluenesulfonates and other salts such as those that provide relatively insoluble products that afford a low release of the active material, for example, a 1,1'-methylene-bis(2-hydroxy-3-naphthoate) and the like.

The novel pyranones of structure I which contain one asymmetric carbon atom in the propylene chain would be obtained as a racemic mixture which can be separated into optically active isomers by known methods, for example, by forming a salt with an optically active acid, many of which are known to those skilled in the art, such as optically active tartaric, mandelic, cholic, O,O-di-p-toluoyl tartaric, O,O-di-benzoyl tartaric acids, or other acids conventionally employed for this purpose.

The potential of a product as a $\beta$-adrenergic blocking agent conventionally is evaluated by the protocol which was employed to assess the O-blocking properties of the pyranone compounds of this invention. The protocol comprises intravenous administration of graded doses of the selected compound to rats which then are challenged with a standard dose of isoproterenol, a product known to be a $\beta$-stimulant.

The clinical application of $\beta$-adrenergic blocking agents is well known to physicians. Uses for the novel pyranones of this invention include treatment of angina pectoris, catecholamine induced cardiac arrhythmias, hypertension, and for the control of tachycardia that may be drug induced (as by isoproterenol) or brought about by physiological conditions. In view of the considerable amount of literature that has accumulated concerning the use of $\beta$-adrenergic blocking agents, physicians would employ the products of this invention in any of the known conditions where a $\beta$-blocker is needed, such as the management of angina pectoris.

The products can be prepared in pharmaceutical formulations suitable for oral or parenteral administration preferably in the form of tablets, solutions, suspensions and emulsions. No special problems are involved in preparing suitable formulations of these products and methods generally employed for this purpose and the usual excipients, diluents, lubricants and extenders, all of which are well known to those skilled in this art are suitable for preparing the desired dosage form. Dosage units of from about 1 mg. to about 40 mgs. can be provided for the symptomatic adjustment of dosage by the physician depending upon the age and condition of the patient.

The novel pyranone products I can readily be prepared by the reaction scheme illustrated below:

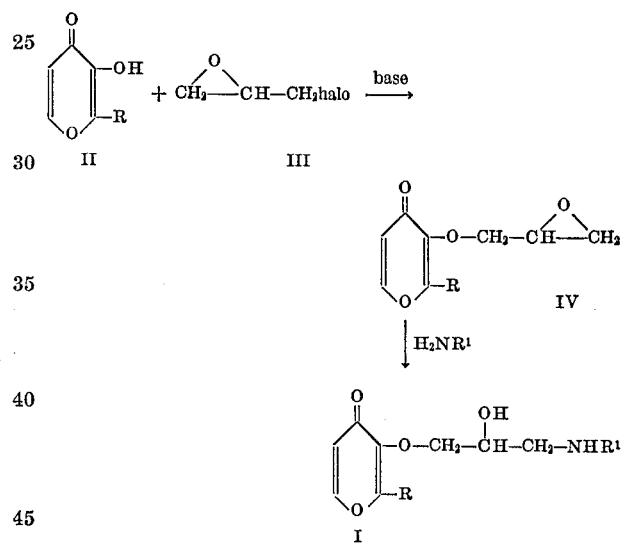

The 3-hydroxy-2-R-4-pyranone, II, is treated with epichlorhydrin or epibromhydrin (III) to provide the epoxide, IV. The reaction advantageously is carried out in the presence of a strong base which may suitably be sodium or potassium hydroxide and in an apparatus protected from oxygen. The reaction proceeds at room temperature though if desired slight heating can be employed. Treatment of the epoxide, IV, with an amine of the structure $H_2NR^1$ provides the desired pyranone, I. An excess of the amine generally is employed for its solvent properties; from 3 to 5 moles of the amine being adequate to give very good yields of the desired product. This step can be carried out at ambient temperature but heat may be empoyed if desired.

The following examples will illustrate representative products of this invention prepared by the above described procedure. It will be understood that these compounds can be prepared by modifications of the procedure described or indeed by other known routes and the following examples therefore are not to be considered as limiting the preparation of any particular compound to the method described in the examples which are provided solely to illustrate the best mode currently known to applicants for the preparation of the novel pyranones of this invention.

EXAMPLE 1

3-(3-*tert*-butylamino-2-hydroxypropoxy)-2-methyl-4-pyranone hydrogen maleate 3-Hydroxy-2-methyl-4-pyranone (12.6 g., 0.1 mole) is dissolved in water (50 ml.) containing sodium hydroxide (4 g., 0.1 mole) by stirring and under a blanket of nitrogen. To this solution is added epichlorhydrin (9.25 g., 0.1 mole) with continued stirring under nitrogen until the mixture becomes a solution; about 2 hours. The solution then is stirred an additional hour at room temperature and then extracted with 4× 120 ml. of chloroform. The combined chloroform extracts are washed with water and evaporated to dryness to give 2-methyl-3-(2,3-epoxypropoxy)-4-oxopyran in the form of an oil (8.38 g.). The obtained oil is dissolved in *tert*-butylamine (100 ml.) and left at ambient temperature for 52 hours. The solution is evaporated to dryness in vacuo on a rotor providing 10.65 g. of an oily product. This product is dissolved in ethyl acetate (50 ml.) and treated with a solution of maleic acid (5.5 g.) in ethyl acetate (100 ml.) to provide a somewhat gelatinous product. Treatment of this product with methanol provides 3-(3-*tert*-butylamino-2-hydroxypropoxy)-2-methyl-4-pyranone hydrogen maleate, yield 5.9 g., softening at 122° C., m.p. 128–131° C.

Analysis calculated for $C_{13}H_{21}O_4N \cdot C_4H_4O_4$: C, 54.98; H, 6.79; N, 3.77. Found: C, 54.81; H, 6.83; N, 3.66.

EXAMPLE 2

3-(3-isopropylamino-2-hydroxypropoxy)-2-ethyl-4-pyranone

By replacing the pyranone and the *tert*-butylamine employed in Example 1 by equivalent quantities of 3-hydroxy-2-ethyl-4-pyranone and isopropylamine, respectively, and following substantially the same procedure described in Example 1 there is obtained 3-(3-isopropylamino-2-hydroxypropoxy)-2-ethyl-4-pyranone.

EXAMPLE 3

3-[3-(2,2-dimethylpropylamino)-2-hydroxypropoxy]-2-methyl-4-pyranone

By replacing the *tert*-butylamine employed in Example 1 by an equivalent quantity of 2,2-dimethylpropylamine and following substantially the same procedure described in Example 1 there is obtained 3-[3-(2,2-dimethylpropylamino)-2-hydroxypropoxy]-2-methyl-4-pyranone.

EXAMPLE 4

3-[3-(1,1-dimethyl-2-hydroxyethylamino)-2-hydroxypropoxy]-2-methyl-4-pyranone By replacing the *tert*-butylamine employed in Example 1 by an equivalent quantity of 1,1-dimethyl-2-hydroxyethylamino and following substantially the same procedure described in Example 1 there is obtained 3-[3-(1,1-dimethyl-2-hydroxyethylamino) - 2 - hydroxypropoxy]-2-methyl-4-pyranone.

EXAMPLE 5

3-[3-(1,1-dimethylpropynylamino)-2-hydroxypropoxy]-2-methyl-4-pyranone

By replacing the *tert*-butylamine employed in Example 1 by an equivalent quantity of 1,1-dimethylpropynylamine and following substantially the same procedure described in Example 1 there is obtained 3-[3-(1,1-dimethylpropynylamino)-2-hydroxypropoxy]-2-methyl-4-pyranone.

EXAMPLE 6

3-(3-*tert*-butylamino-2-hydroxypropoxy)-2-propyl-4-pyranone

This product is prepared by replacing the 3-hydroxy-2-methyl-4-pyranone employed in Example 1 by an equivalent quantity of 3-hydroxy-2-propyl-4-pyranone and following the method described in Example 1.

EXAMPLE 7

3-(3-*tert*-butylamino-2-hydroxypropoxy)-2-benzyl-4-pyranone

This product is prepared by replacing the 3-hydroxy-2-methyl-4-pyranone employed in Example 1 by an equivalent quantity of 3-hydroxy-2-benzyl-4-pyranone and following the method described in Example 1.

EXAMPLE 8

3-[3-(1-methyl-2-phenethylamino)-2-hydroxypropoxy]-2-methyl-4-pyranone

By replacing the *tert*-butylamine employed in Example 1 by an equivalent quantity of 1-methyl-2-phenethylamine and following substantially the same procedure described in Example 1 there is obtained 3-[3-(1-methyl-2-phenethylamino) - 2 - hydroxypropoxy]-2-methyl-4-pyranone.

EXAMPLE 9

3-{3-[1-methyl-2-(3-indolyl)ethylamino]-2-hydroxypropoxy}-2-methyl-4-pyranone By replacing the *tert*-butylamine employed in Example 1 by an equivalent quantity of 1-methyl-2-(3-indolyl)-ethylamine and following substantially the same procedure described in Example 1 there is obtained 3-{3-[1-methyl-2-(3-indolyl)ethylamino] - 2 - hydroxypropoxy}-2-methyl-4-pyranone.

EXAMPLE 10

3-[3-(1,1-dimethyl-2-phenethylamino)-2-hydroxypropoxy]-2-methyl-4-pyranone

By replacing the *tert*-butylamine employed in Example 1 by an equivalent quantity of 1,1-dimethyl-2-phenethylamine and following substantially the same procedure described in Example 1 there is obtained 3-[3-(1,1-dimethyl - 2 - phenethylamino) - 2 - hydroxypropoxy]-2-methyl-4-pyranone.

EXAMPLE 11

3-{3-[1,1-dimethyl-2-(3-indolyl)ethylamino]-2-hydroxypropoxy}-2-methyl-4-pyranone By replacing the *tert*-butylamine employed in Example 1 by an equivalent quantity of 1,1-dimethyl-2-(3-indolyl)-ethylamine and following substantially the same procedure described in Example 1 there is obtained 3-{3-[1,1-dimethyl - 2 - (3-indolyl)ethylamino] - 2 - hydroxypropoxy}-2-methyl-4-pyranone.

EXAMPLE 12

3-{3-[2,2-dimethyl-2-(3-indolyl)ethylamino]-2-hydroxypropoxy}-2-methyl-4-pyranone By replacing the *tert*-butylamine employed in Example 1 by an equivalent quantity of 2,2-dimethyl-2-(3-indolyl)-ethylamine and following substantially the same procedure described in Example 1 there is obtained 3-{3-[2,2-dimethyl-2-(3-indolyl)ethylamino] - 2 - hydroxypropoxy}-2-methyl-4-pyranone.

We claim:
1. A pyranone having the general structure

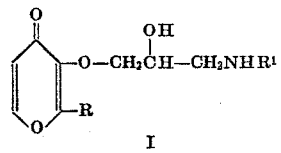

I and pharmacologically acceptable salts thereof wherein R is selected from the group consisting of $C_{1-3}$ alkyl and phenyl-$C_{1-3}$ alkyl; and $R^1$ is selected from straight or branched chain $C_{3-6}$ alkyl, straight or branched chain hydroxy substituted $C_{3-6}$ alkyl, straight or branched chain $C_{3-6}$ alkynyl, phenyl-$C_{1-6}$ alkyl and 3-indolyl-$C_{1-6}$ alkyl.

2. A product as claimed in Claim 1 wherein R is $C_{1-3}$ alkyl and $R^1$ is a straight or branched chain $C_{3-6}$ alkyl.

3. 3-(3-*tert*-butylamino-2-hydroxypropoxy)-2-methyl-4-pyranone.

References Cited

UNITED STATES PATENTS 3,641,152  2/1972  Shavel et al. _____ 260—570.7

NORMA S. MILESTONE, Primary Examiner

U.S. Cl. X.R.

260—326.15, 999